No. 672,145. Patented Apr. 16, 1901.
J. CHRISTIANSEN & F. M. DEWING.
AUTOMATIC WEIGHING MACHINE.
(Application filed Aug. 5, 1899.)
(No Model.) 5 Sheets—Sheet 2.

Witnesses:
Jos. Merritt
H. Mallnn

Inventors:
John Christiansen
Fred Mellen Dewing
By their Att'y. W. H. Honiss

No. 672,145. Patented Apr. 16, 1901.
J. CHRISTIANSEN & F. M. DEWING.
AUTOMATIC WEIGHING MACHINE.
(Application filed Aug. 5, 1899.)
(No Model.) 5 Sheets—Sheet 5.
Fig. 5
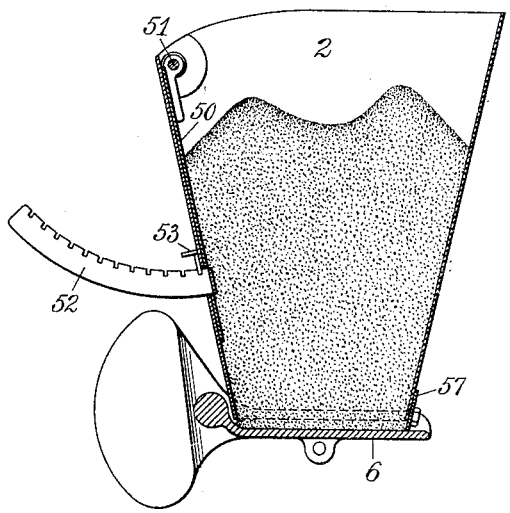
Fig. 6
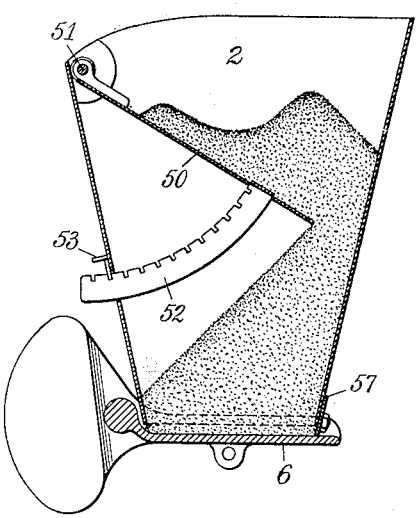
Fig. 9
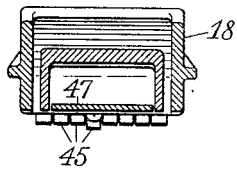
Fig. 10
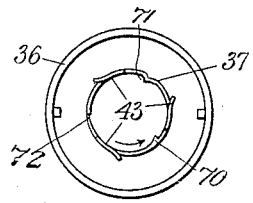
Fig. 11
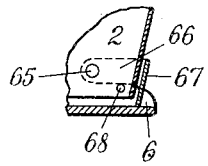
Fig. 7
Fig. 8
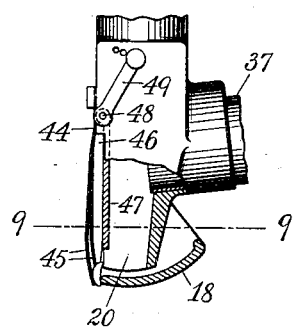
Witnesses:
Jos. Merritt
H. Mallmer
Inventors:
John Christiansen
Fred Mellen Dewing
By their Att'y.
W. H. Honiss

UNITED STATES PATENT OFFICE.

JOHN CHRISTIANSEN AND FRED MELLEN DEWING, OF HARTFORD, CONNECTICUT.

AUTOMATIC WEIGHING-MACHINE.

SPECIFICATION forming part of Letters Patent No. 672,145, dated April 16, 1901.

Application filed August 5, 1899. Serial No. 726,317. (No model.)

*To all whom it may concern:*

Be it known that we, JOHN CHRISTIANSEN and FRED MELLEN DEWING, citizens of the United States, and residents of Hartford, in the county of Hartford and State of Connecticut, have invented certain new and useful Improvements in Automatic Weighing-Machines, of which the following is a specification.

This invention relates to machines for automatically and continuously weighing materials of a granular nature by successive loads of a predetermined size.

The object of the invention is generally to improve the organization and details of construction of weighing-machines, including means whereby they are made readily convertible, so as to adapt them to receive, weigh, and deliver materials of widely-varied degrees of fineness or coarseness or which differ to a considerable extent in specific gravity.

These improvements, furthermore, comprise means for feeding the material, and particularly coarse granular substances, in a more or less attenuated stream of uniform volume and rate of flow, particularly with respect to what is now well known in this art as the "drip-supply" stream, the said means comprising a substantially horizontal rotating tubular conduit through which the supply-stream gravitates.

The invention, furthermore, comprises improved details of construction, which will be hereinafter particularly described and claimed.

Figure 1:
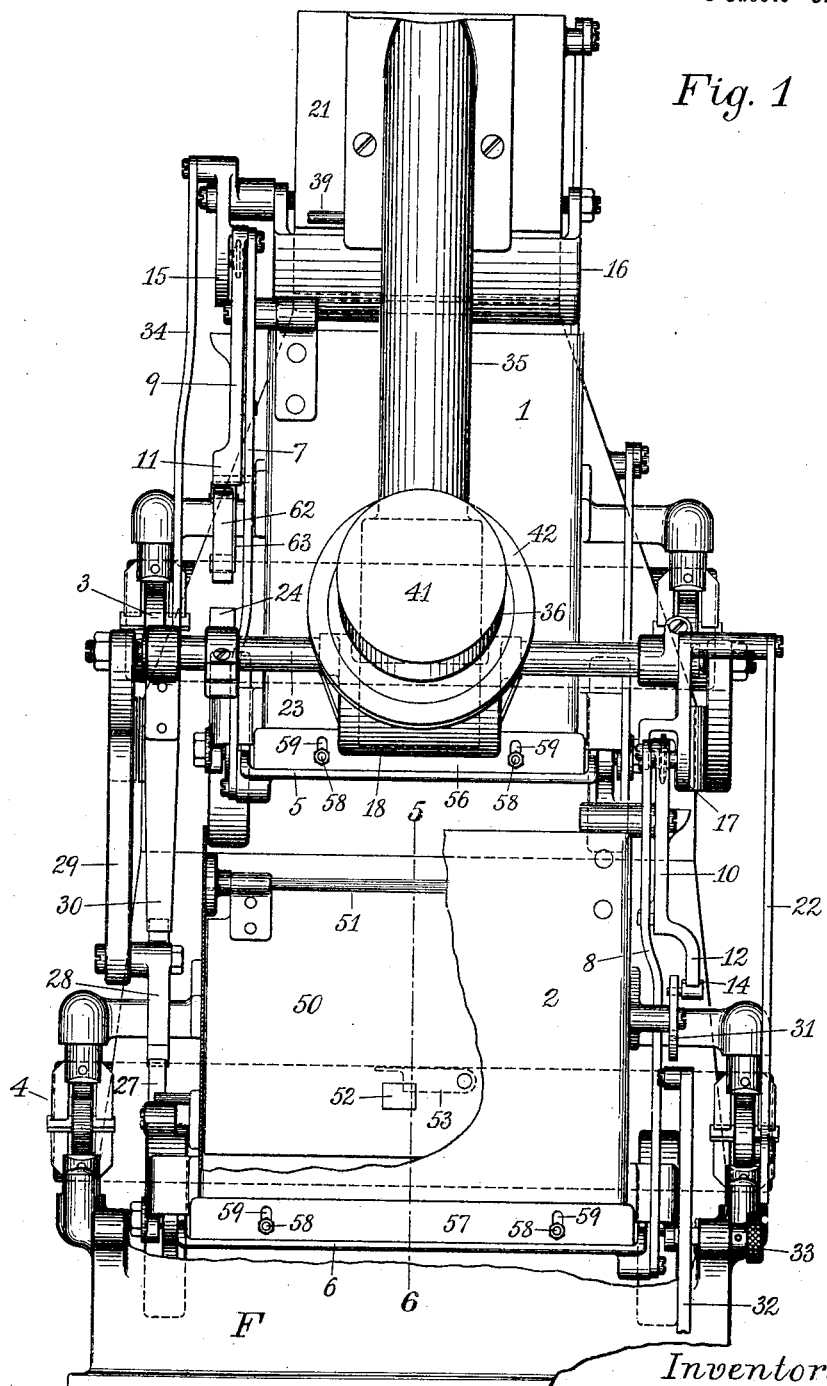
Figure 2:
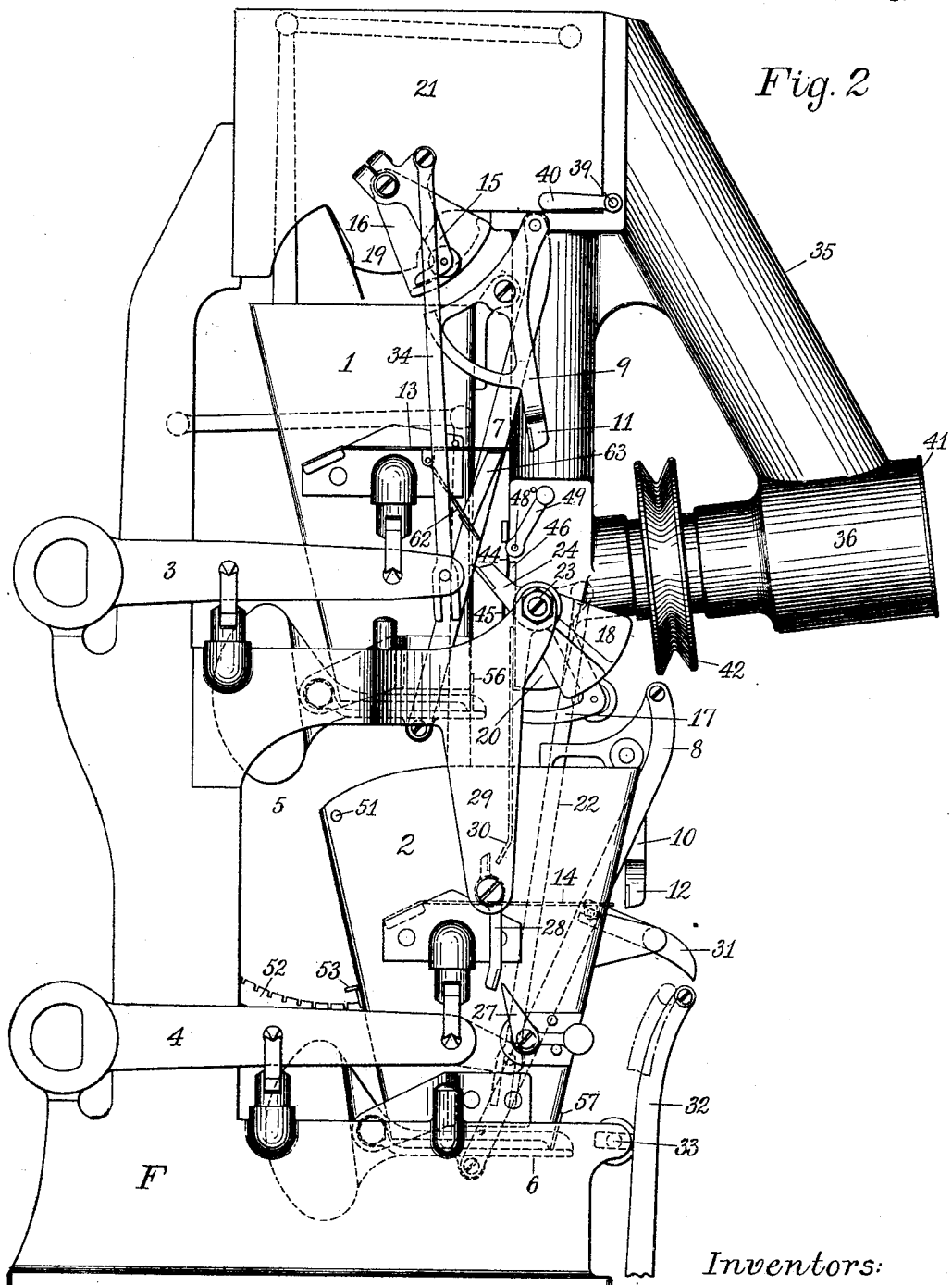
Figure 3:
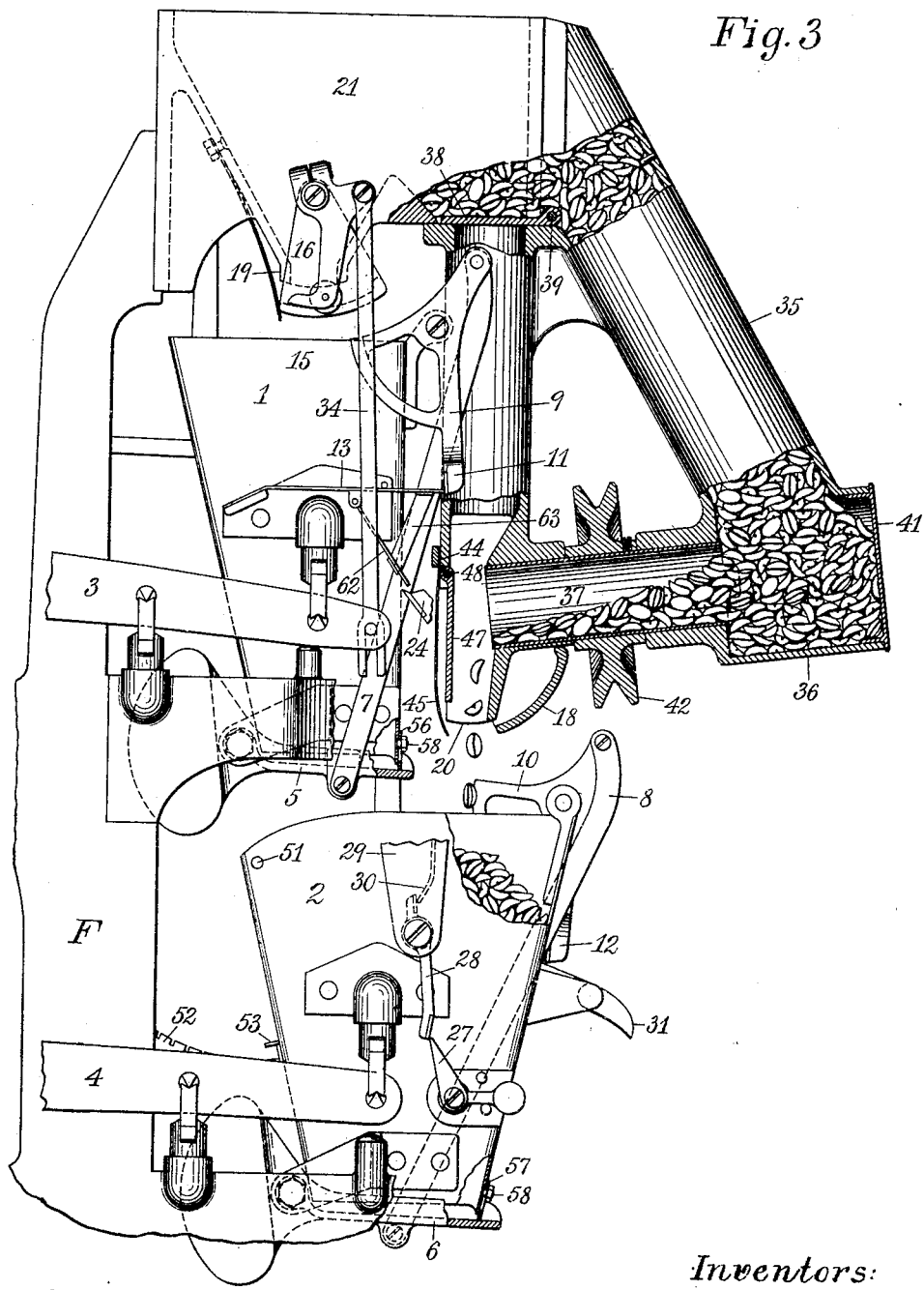
Figure 4:
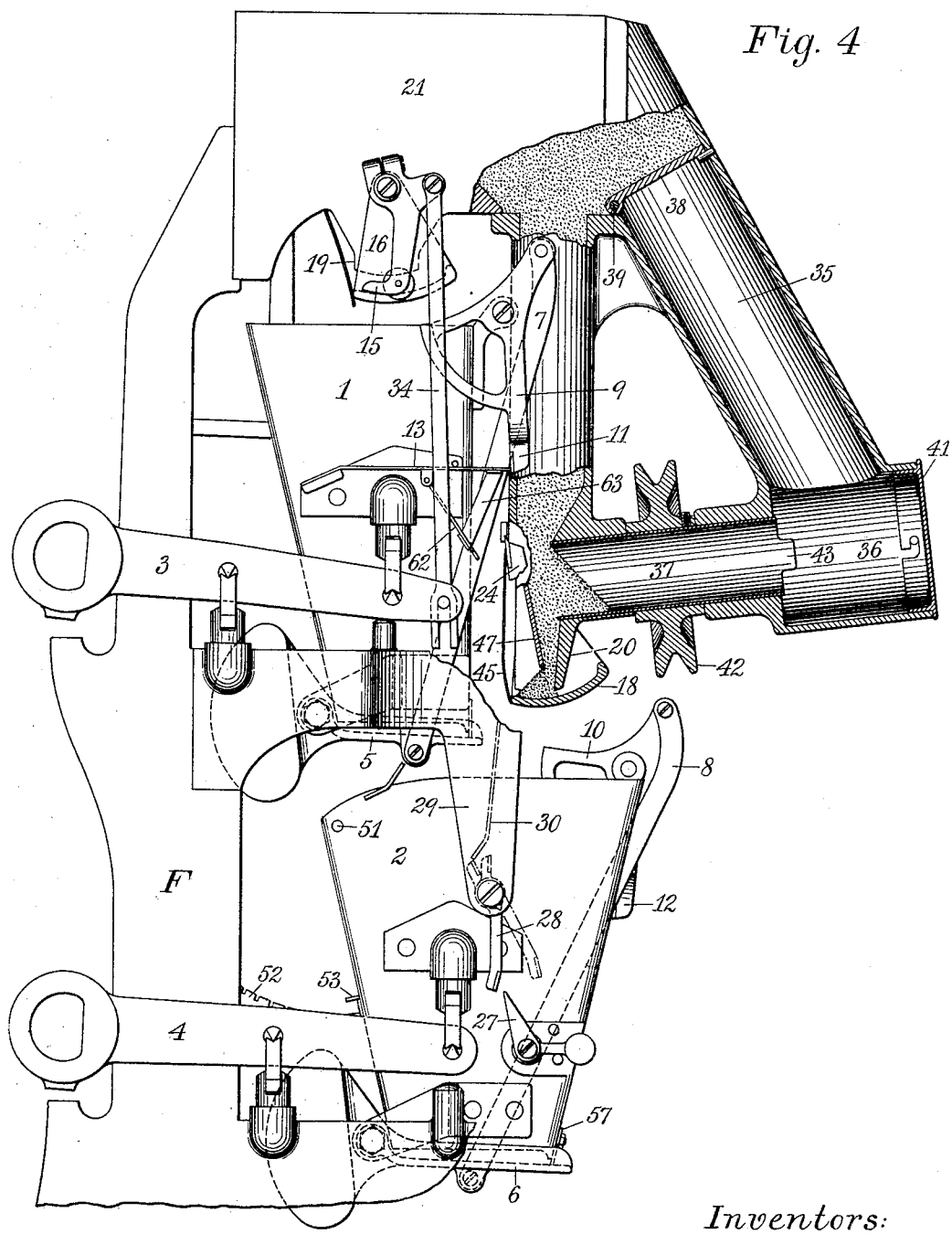

Figure 1 of the drawings is a front view, and Fig. 2 is a side view, of a machine embodying the improvements of our present invention, the various parts being shown in the position occupied by them when the entire machine is out of operation and with no material flowing into the hopper. Fig. 3 is a side view similar to that of Fig. 2 showing the machine in operation upon coarse granular material. The lower bucket is here shown to be at its poising-point. In this view portions of the front wall of the lower bucket and of the hopper are broken away and the rotating feed-tube is shown in section, taken through the vertical plane of its longitudinal center. Fig. 4 is a side view similar to that of Fig. 3 showing the machine at a point in its operation immediately succeeding that of Fig. 3 with the drip-valve closed. In this figure the machine is shown to be in operation upon fine granular material as compared with that shown in Fig 3, the rotating feed-tube and its spout being out of operation. Figs. 5 and 6 are side views in section taken along the line 5 6 of Fig. 1, showing the bucket-closer with its space-contracting means in its extreme positions. Fig. 7 is a rear view, and Fig. 8 a side view, of the drip-spout, showing the valve in its closed position against the flexible seat or closure. In Fig. 8 the lower portions of the spout and of the valve are shown in section, taken vertically through their longitudinal center. Fig. 9 is a plan view in section taken on the line 9 9 of Fig. 8, showing the operation of the flexible valve-seat when one of the larger grains has become lodged between it and the valve. Fig. 10 is a front end view of the feed-tube and its channel with the cap removed. Fig. 11 is a fragmentary side view of a modified method of suspending the yielding seats for the bucket-closer.

Similar characters are employed to designate the corresponding parts in all the figures of the drawings.

The devices of our present invention are applicable to various types of weighing apparatus; but they are herein shown as applied to a weighing-machine employing two load-receiving buckets, one of which (designated herein as the "meter-bucket" 1) is located above and discharges into the other, which is herein designated as the "final-load" bucket 2. These buckets are mounted upon the scale-beams 3 and 4, respectively, provided with the customary knife-edge pivots. All of the parts are mounted upon a suitable framing F, which consists of a base provided with upwardly-extending arms and brackets adapted to receive and support the operating devices of the machine.

The meter-bucket takes the major portion of the load from the main spout 19, leaving only a small percentage of the load to be completed from the drip-spout 20. The load taken by the meter-bucket 1 being merely an approximation of the required load, it is filled quickly and immediately empties into the final bucket 2, the load being completed more slowly for the sake of accuracy by the flow of the reduced drip-stream directly from the spout 20.

The buckets 1 and 2 are provided with the closers 5 and 6, pivotally mounted at their lower ends. These bucket-closers are suitably counterweighted and are provided with the connecting-rods 7 and 8, the upper ends of which are attached to the rockers 9 and 10, respectively, pivotally mounted upon the buckets at their upper ends. The buckets are provided with the radially-extending detent-arms 11 and 12 for engaging with the latches 13 and 14, attached to the respective buckets. The rockers 9 and 10 and their rods 7 and 8 are so arranged and disposed as to form toggles, which serve, as shown in Fig. 2, to hold their respective bucket-closers shut with very slight pressure against the latches 13 and 14, so that the latter may be operated with the least possible amount of frictional resistance, thereby interfering as little as possible with the delicacy of the weighing operations. The rocker 9 is located in suitable engaging relation to the stop of the main-supply valve 16, while the rocker 10 is located in similar relation to the stop 17 of the drip-supply valve 18.

The construction and arrangement of each of the rockers 9 and 10 and of their respective stops 15 and 17 is such as to adapt them to serve as interlocking devices for each other, so that the supply-valves cannot be opened to allow material to flow into the buckets, excepting when their respective closers are shut, and vice versa. This construction, arrangement, and operative relation is similar to that of the corresponding parts shown in United States Patent No. 548,840, of October 29, 1895, and need not therefore be more specifically described herein. The stop 17 for the supply-valve 18 serves also as a means for interlocking the operating devices of the two buckets, so that the meter-bucket 1 cannot be discharged, excepting when the closer 6 of the bucket 2 is in its closed position ready for the load. When the parts are in the position shown in Fig. 2, both buckets and the hopper 21 are supposed to be entirely empty of material, although their respective valves 16 and 18 are open. As shown also in this figure, the detents 11 and 12 are allowed considerable amplitude of movement beyond their latching positions, so as to insure certainty of latching. When the material is supplied to the hopper, it flows through the open valves 16 and 18. The meter-bucket 1 fills quickly and falls to the position shown in Fig. 3, closing the valve 16, the weight of the grain upon the bucket-closer 5 bringing the detent 11 of the rocker 9 against the latch 13, where it rests until the final-load receiver 2 is ready for it. When the lower bucket-closer 6 is in its closed position, (shown in Fig. 2,) its rocker 10 is out of the way of the stop 17 of the drip-supply valve 18, thereby permitting the latter to be opened by its opening-rod 22, attached to the outer end of the scale-beam 4, which operates, as it rises, to swing open the valve 18. The shaft 23 of the supply-valve 18 has fixed upon it the dog 24, which as the valve swings to its open position collides with the by-pass 62 of the latch 13 and withdraws the latter below the end of the detent 11, thereby permitting the weight of the material resting upon the bucket-closer 5 to open that closer, swinging the rocker 9 behind the stop 15 of the valve 16 and preventing the latter from opening during the discharge of the bucket. As soon as the discharge is completed the bucket-closer shuts the bucket 1, its beam 3 and the rocker 9 returning to their position, (shown in Fig. 2,) thus allowing the valve 16 to be again opened by the rod 34, resting on the outer end of the beam 3. Thus the meter-bucket is again filled and drops to the position shown in Fig. 3, awaiting the succeeding operation of the final-load-receiving bucket 2. Thus upon rising from its discharging operation to the position shown in Fig. 2 and opening the supply-valves 16 and 18, as above described, the final-load bucket 2 receives its initial load from the meter-bucket. The drip-supply stream from the valve 18 continues until the load passes its poising-point to the discharging position, (shown in Fig. 3,) at which time the by-pass latch 27, pivotally mounted on the bucket 2, releases the detent-lever 28. That lever is pivotally supported upon the arm 29, extending over the framing F, the lower and longer end of the lever engaging with the by-pass 27, while the upper and shorter end engages with the detent-arm 30 of the supply-valve 18. Upon reaching the position shown in Fig. 3 the by-pass latch 27, by releasing the lever 28, allows it to swing, so as to liberate the detent-arm 30, thus permitting the supply-valve 18 to swing to its closed position, (shown in Fig. 4,) where it rests until the final-load bucket 2 is emptied and again returned to the position shown in Fig. 2, thereby opening the drip-supply valve 18 and receiving its succeeding initial load from the meter-bucket 1, as above described. The latch 14 of the final bucket 2 is tripped upon reaching the discharging position (shown in Fig. 3) by means of a tripping-lever 31, pivotally mounted upon the bucket 2, with its inner end extending into engaging relation with the latch 14. The outer end of the arm collides with the tripping-arm 32, which is mounted on the framing F, so as to depress the latch 14 and allow the bucket-closer 6 to open, thus discharging the contents of the final-load bucket. The tripping-arm 32 is shown in Fig. 2 in two positions, the full-line position being that at which it trips the arm 31, while in its inner or dot-and-dash position the arm does not operate the lever. The arm may be placed in either of these positions at the will of the operator, being for this purpose pivotally mounted at 33 on the framing F.

Having thus described the general features of the machine in which our improvements are herein shown to be embodied, we will now proceed to describe those improvements in detail. These principally comprise devices for adapting machines of this class to the weighing of materials of differing degrees of fineness or of differing specific gravities, the devices being more particularly adapted to the regulation and control of the drip-supply.

In practical experience with automatic weighing-machines it has been found that the correct regulation of the volume, length, and weight of the drip-supply stream is an exceedingly-important factor in the obtaining of accurate results. For example, it will be seen that the amount of material in the drip-stream which is falling through the air at the moment of closing the drip-supply valve must be accurately predetermined, since this is added to the final load. Therefore the drip-supply must be cut off just when the proper quantity has passed the valve and before the weight of the falling column, then in the air, has been added to the load in the bucket. If, then, after the machine has been properly adjusted for a given load, either the volume or the length of the drip-supply column should be changed, it will materially affect the accuracy of the weighing operations. In order to obviate this difficulty, we have provided means for feeding and cutting off a drip-supply of uniform volume, whether of coarse or fine material, and means for contracting the space in the final-load bucket, so as to enable the weight or volume of load to be varied without varying the length of drip-stream.

The hopper 21 is provided with the main spout 19 and with two drip-supply spouts 20 and 35, the first of which leads directly from the hopper 21 to the final-load bucket 2. The drip-supply spout 35 leads rearwardly from the spout to the chamber 36 at the end of the feed-tube 37. The ends of the supply-spout 20 and 35, opening from the hopper 21, are provided with the gate 38, which is pivotally mounted between the two spouts, so as to close either one, as shown in Figs. 3 and 4. This gate is fixed upon the shaft 39, which extends through the side of the machine, and is provided with a handle 40, (shown in Fig. 2,) by means of which the gate may be operated or its position ascertained at a glance. When it is desired to weigh comparatively fine material, the direct drip-spout 20 is employed, as shown in Fig. 4, the opening of the spout 34 being then closed by means of the gate 38. On the other hand, when it is desired to feed comparatively coarse granular material the spout 20 is closed by means of the gate and the material is fed through the outer spout 35 and the feed-tube 37, as shown in Fig. 3. By this arrangement we are enabled to employ the same drip-plate 47 and drip-supply valve 18, whether the drip-supply is fed through the spout 20 or through the spout 35, thus avoiding the complication and additional adjustment attendant upon the use of a separate drip-plate and valve for each drip-supply feeder, the operation of the rest of the machine as a whole being the same, whichever one of the feeding devices may be in action.

As a means for attenuating and regulating the supply-stream, a substantially horizontal tubular conduit is provided, through which the stream may be passed. This conduit, as illustrated in Fig. 3, is preferably somewhat inclined from the horizontal; but it is obvious that it may be horizontal, or may be slightly inclined therefrom in either direction, according to the length and diameter of the conduit employed or according to the nature, coarseness, or specific gravity of the material to be regulated. This rotating conduit operates rather to retard the rate of flow of the material than to force or accelerate it, so that the material emerges from the conduit at a diminished rate of flow, which may, however, be regulated by altering the inclination of the rotating conduit, as above stated, or by changing its rate of rotation.

The feed-tube 37 is rotatably mounted in suitable bearings in the lower ends of the supply-spouts 20 and 35, being provided with a pulley 42, by means of which it may be rotated at any desired speed from a convenient counter-shaft. The axis of the feed-tube 37 is preferably inclined downwardly toward its discharging end, as best shown in Fig. 3. The right-hand end of the tube is provided with the projecting wings 43, which extend into the drip-supply chamber 36 and are preferably curved outwardly, as shown in the end view of Fig. 10, so as loosen the granular material in the chamber and to cause it to feed more evenly and readily into the tube. The material in passing through the tube assumes the general form shown in Fig. 3 by reason of the rotative action of the tube, thereby tending to cause a uniform flow of the drip-stream. The front of the chamber 36 is provided with a removable cap 41, by means of which the inside of the chamber may be readily inspected or its contents removed.

In the feeding of the coarse grades of granular material some of the grains are liable to become caught or lodged between the supply-valve and its seat as the valve closes. This would sometimes prevent the valve from closing far enough to enable it to be latched securely, and would thus impair the efficiency or accuracy of the machine. As a means for preventing this derangement a yielding seat is provided for the valve, which in its preferred form is shown in Figs. 7, 8, and 9. The valve-seat 44 is made of flexible material, such as sheet steel or brass, and is slit longitudinally to form independent flexible fingers 45, either one of which may be deflected without interfering with the other. This valve-seat is fastened by means of screws, as shown in Fig. 7, to the lower end of the chute, with the lower ends of its fingers extending to the closing edge of the valve 18. When a grain of the material becomes lodged against one of the fingers, as shown in Figs. 8 and 9, it deflects only that finger which is sufficiently flexible to allow the valve to close fully to its latching position, and thus prevents leakage of the material and consequent irregularity in the drip-supply.

In the preferred form of drip-spout (shown in Figs. 7, 8, and 9) the front wall of the drip-supply spout is cut away at 46, its place being taken by the swinging drip-plate 47, which is pivotally mounted at 48 at or near the rearward side of the spout and is provided with the setting-arm 49, which, by means of the setting-holes shown in Fig. 8, may be adjusted to any desired position to suit variations in the fineness or in the specific gravity of the material being weighed. This drip-plate swings above and independently of the supply-valve 18, and therefore does not coöperate therewith in the regulation of the drip-supply stream.

The device for varying the load-space in the final bucket 2 comprises a movable diaphragm, which, as best shown in Figs. 5 and 6, consists, preferably, of a swinging plate 50, pivotally mounted at 51 at one side of the bucket 2. This plate is supported in any desired position by means of the notched quadrant 52, which is attached to the plate and extends through a slot in the wall 53 of the bucket, being retained in any desired position by means of the latch 53, which is pivotally mounted upon the wall. In Fig. 5 the plate 50 is folded down close against the front wall of the bucket, so as not to contract the area thereof, while in Fig. 6 the plate is supported at such a position that half of the load shown in the bucket of Fig. 5 will be at approximately the same level in the bucket of Fig. 6, thereby determining that the length of the drip-stream column must be the same in both cases. This device is also useful in adjusting the machine to weigh material of differing specific gravity, or even to vary the length of the falling drip-column, which is also often found to be desirable and convenient.

In order to enable the bucket-closers 5 and 6 to be closed and latched with certainty even when foreign material or other obstacles may become lodged between the closing edges, the closers are mounted so as to leave a clear space between them and the lower edges of the bucket, the latter being provided with a yielding seat or closure to meet the upper side of the front or discharging end of the closers. These yielding seats 56 and 57 (best shown in Figs. 1 and 3) each consist of a flat plate extending across the front sides of the buckets 1 and 2 adjacent to the discharge-openings thereof. The plates are loosely attached to their respective buckets by means of the screws 58, passing through the slotted holes 59 in the plates. These slots allow the plates to rest in contact with the bucket-closers 5 and 6 when the latter are in their latched positions and also allow the plates to be raised therefrom by any grains that may become lodged beneath their edges, thus allowing for such a contingency without permitting the material to flow out and without preventing the bucket-closers from being positively shut and latched at each operation. These plates may also be pivotally attached to the buckets, as shown in Fig. 11, by means of screws or rivets 65, passing through ears 66, formed at the ends of the plate 67, the downward limit of movement being determined by the stop 68. This for many purposes is our preferred method of mounting this plate, the function and mode of operation of which is identical with those of the plates 56 and 57.

In the weighing of sugar, gums, and similar materials it is found that the fine particles thereof find their way into the exposed bearings of the machine and by their sticky nature tend after a longer or shorter period to interfere with the free working of oscillating or pivotally-mounted parts. This is peculiarly the case with the latches ordinarily employed in machines of this class, which should at all times operate with perfect freedom and promptness. When these latches are pivotally mounted upon studs in the usual way, it is found that the floating particles of powder or gum enter the bearings and operate to impede the movement of the latches, so that they operate more and more slowly and finally will not drop at all by their own weight. To obviate this difficulty, we employ resilient latches 13 and 14, which are fixed firmly to their seats instead of being pivotally supported, the length of the latch being made sufficient to enable it to vibrate freely by its own resilience, the freedom of its operation being not in the slightest degree impaired by the deposit of sugar or gummy material, however long continued.

As a means of adapting the latch 13 to operate as a by-pass—that is, to be operated positively in one direction by the dog 24 and to allow of the return movement of the dog without operating the latch—it is provided with the by-pass 62, suspended from the latch upon pivots which may be very loose, so as to preclude the above-described liability of being set by the action of the gum. This by-pass rests against a stirrup 63, by means of which the latch is caused to be depressed by the dog 24 upon the opening movement of the valve 18, while upon the return movement of that dog the by-pass 62 is lifted from the stirrup 63 far enough to enable the dog to pass to its closed position. (Shown in Fig. 4.)

The inclined rotating tubular feeder 37 is susceptible of general application to many types of weighing-machines, and it may be so mounted as to project into and receive its supply directly from the main supply-hopper.

It should, however, be so located as to receive an unvarying and constant supply, the receiving end being preferably entirely submerged in the material, as shown in the drawings. In the feeding of some substances it may be found desirable to provide the interior surface of the feeder-tube with longitudinal grooves forming one or more of the shoulders 70, 71, or 72, (shown in Fig. 10,) which tend to carry the material farther around with the rotations of the tube before releasing it, thereby facilitating the feeding action. In many similar ways these and the other improved devices herein shown may be modified as to form, location, and coöperation without departing from the essential features of the invention.

We claim as our invention—

1. In a weighing-machine, the combination of means for feeding materials of differing fineness, consisting of a direct supply-spout for the finer material leading from the hopper to the load-receiving bucket, a substantially horizontal rotating feed-tube for feeding the coarser material, and means for diverting the drip-supply from the direct supply-spout to the feeder and vice versa.

2. In a weighing-machine, means for feeding material of varying fineness, consisting of a direct supply-spout for the finer material, and of a substantially horizontal rotating feed-tube, connected at one end with a supply-spout from the hopper, and discharging the material from its other end into the direct supply-pipe.

3. In a weighing-machine, the combination of means for feeding material of differing fineness, consisting of a direct supply-pipe, a valve therefor, a substantially horizontal rotating feed-tube for the coarser material intersecting the direct pipe and delivering the material thereto above the valve.

4. In a weighing-machine, in combination with the valve and bucket-closer devices thereof, a latch therefor of resilient material, secured to its support by non-pivotal means, and supported by its own resiliency in its latching position, and a by-pass arm supported on the latch and operating to trip the latch when moved in one direction, and swinging idly without operating the latch when moved in the other direction.

5. In combination with a weighing-machine, means for attenuating and regulating a supply-stream, consisting of a substantially horizontal rotating conduit through which the supply-stream passes.

6. In combination with a weighing-machine, means for uniformly feeding the drip-supply thereof, consisting of an inclined rotating tubular feeder for receiving the drip-supply at one end and discharging it at the opposite end.

7. In combination with a weighing-machine, a feeder for the drip-supply thereof, consisting of a tube having a substantially uniform interior diameter throughout its length, and rotatably mounted with its axis inclined to the horizontal, having its higher end connected with the drip-supply, and its lower end discharging directly to a load-receiving bucket.

8. In a weighing-machine, in combination with the supply-hopper thereof, having independent supply-chutes for the main and drip supply streams, a feeder for uniformly feeding and distributing the drip-supply, consisting of an inclined rotating cylindrical tube through which the drip-supply gravitates from end to end.

9. In a weighing-machine, in combination with the supply spout or hopper thereof, having independent supply-chutes for the main and drip supply streams, a feeder for uniformly feeding and distributing the drip-supply, consisting of an inclined rotating cylindrical tube through which the drip-supply gravitates from end to end, the upper end of the tube being provided with projecting wings for loosening and agitating the material to be fed.

10. In combination with a weighing-machine, means for uniformly feeding the material, consisting of a rotating tubular feeder for receiving material at one end and discharging it at the opposite end, provided with one or more longitudinal shoulders on its interior surface for carrying the material farther around with the rotations of the feeder.

Signed by us at Hartford, Connecticut, this 27th day of July, 1899.

JOHN CHRISTIANSEN.
FRED MELLEN DEWING.

Witnesses:
JENNIE NELLIS CASE,
WM. H. HONISS.